United States Patent [19]

Bicknell et al.

[11] Patent Number: 4,896,350
[45] Date of Patent: Jan. 23, 1990

[54] ARRANGEMENT FOR PROVIDING A CALL-CONNECTION SERVICE

[75] Inventors: Rainie M. Bicknell, Westminster, Colo.; Barbara J. Kittredge, Jackson, N.J.; Craig F. Palmer, Thornton, Colo.; Robert L. Young, Califon, N.J.

[73] Assignees: American Telephone and Telegraph Company, New York, N.Y.; AT&T Information Systems Inc., Morristown; AT&T Bell Laboratories, Murray Hill, both of N.J.

[21] Appl. No.: 329,918

[22] Filed: Mar. 29, 1989

[51] Int. Cl.[4] .............................................. H04M 7/14
[52] U.S. Cl. ................................... 379/220; 379/230; 379/224
[58] Field of Search ............... 379/220, 221, 224, 225, 379/229, 230, 231, 232, 234, 237, 207

[56] References Cited

U.S. PATENT DOCUMENTS 4,191,860  3/1980  Weber .................................. 379/115
4,802,199  1/1989  Lange et al. ........................ 379/221

Primary Examiner—James L. Dwyer
Attorney, Agent, or Firm—David Volejnicek

[57] ABSTRACT

In a private communication network (10) served by a provider of call interconnection services, e.g., a carrier service node (15), the number of trunks (50-52) used within a call path is reduced without affecting the private nature of the private network. The service provider serves customer calls by means of a service node controller (SNC 40)—a switch such as a PBX. The SNC directly interconnects trunks (50,51) that connect it with a call-source and a call-destination node (20,21) of the customer, without routing the call through the customer's tandem node (24). The SNC merely queries the customer's tandem node over a control link (53), such as an ISDN D channel, to obtain requisite call-routing information from the customer's database (60). The customer retains ownership and control of the tandem node and its database, thereby preserving the private nature of the private network.

10 Claims, 7 Drawing Sheets

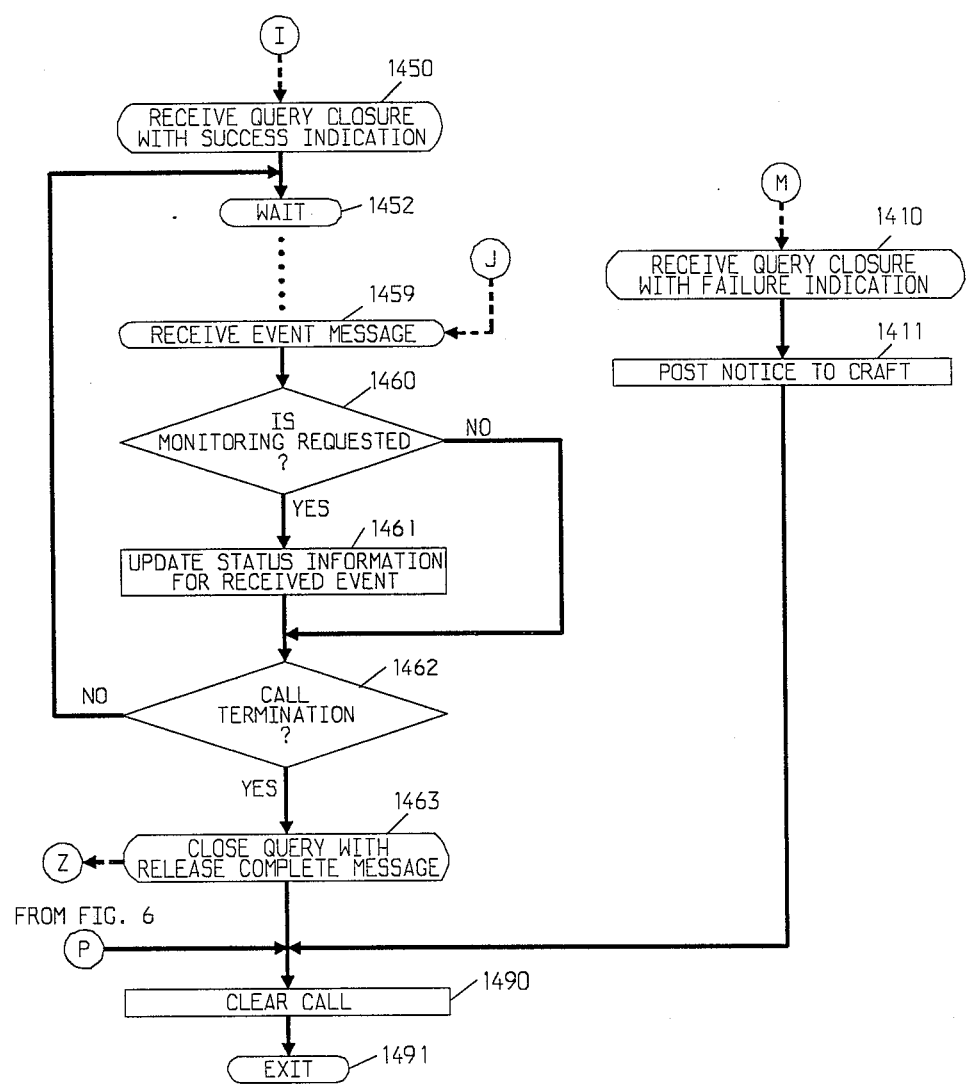

ARRANGEMENT FOR PROVIDING A CALL-CONNECTION SERVICE

CROSS-REFERENCE TO RELATED APPLICATION

Incorporated by reference herein is the application of B.M. Bales and P. E. Miller, "Circuit Switching System for Interconnecting Logical Links Between Packet Switching Networks", filed Dec.28, 1988, Ser. No. 07/290,930.

TECHNICAL FIELD

This invention relates generally to the field of telecommunication, and relates specifically to the establishment of communication paths in a telecommunication network.

BACKGROUND OF THE INVENTION

Large private communication networks often resemble the public communication network in their architecture: they comprise (a) a plurality of "local" switching systems—typically private branch exchanges (PBXs)—which are connected to different groups of customer terminals and provide communication services for those terminals, and (b) "tandem" switching systems—typically also PBXs—whose principal function is to provide communication connections between the "local" switching systems. It is also typical that a "tandem" switching system provides connections between "local" switching systems within only a single, limited, geographical area, whereas connections between geographically widely-dispersed switching systems—both "local" and "tandem" are provided by public network long-distance carriers. The carriers also provide connections between the private networks and the public network.

An example of carrier equipment that provides the connection services mentioned above is the AT&T digital access cross-connect system (DACS). Located at a carrier service node, the DACS is connected by trunks to both "local" and "tandem" private-network switches, and to the carrier's switch for public network access. The DACS provides relatively static interconnections between trunks which are connected thereto, as opposed to dynamic, switched, interconnections. A call incoming to the DACS over a first trunk from an originating "local" switch of a private network is connected through the DACS to the private network's "tandem" switch over a second trunk. The "tandem" switch performs digit collection on the call to determine the call destination. The "tandem" switch has routing information pertaining to the private network, which enables it to determine where and how the call should be routed to its destination. Based on that routing information, the tandem switch selects a third trunk leading back to the DACS, and connects the call thereto. The call is in turn connected through the DACS, to a trunk leading to a destination "local" switch of the private network. The call path from the originating to the destination "local" switches is thus established through the DACS and the "tandem" switch, and requires four trunks.

Economics dictate a desire to reduce the number of trunks used in establishing the call path. For example, the greater the number of trunks used for each call path, the greater the cost to the owner of the privaate network of: (a) buying, installing, and maintaining owned trunks, (b) renting leased trunks, and/or (c) accessing public network trunks. Hence, the owner of a private network desires to use as few trunks per call as possible. It is therefore to the competitive advantage of a carrier to provide the private network owner with the capability of reducing the number of trunks required for a call.

SUMMARY OF THE INVENTION

The invention is directed to meeting the above-outlined desire of the art. Generally according to the invention, the number of trunks used in a call is reduced by connecting call trunks leading to "local" switches directly to each other instead of routing the call through a "tandem" switch. In the example given above, the number of trunks used in a call path is halved. Specifically according to the invention, a communication node belonging to, or otherwise under control of, a call-connection service provider—an interexchange carrier, for example—responds to a request from a customer requesting establishment of a call path between a first and a second node belonging to, or otherwise under control of, the customer—a first and a second PBX of a private network, for example—by obtaining call-routing information from a third node—a "tandem" PBX, for example—which also belongs to, or is controlled by, the customer. The service provider's node then uses the obtained information to connect a call path between the first and second nodes, which call path bypasses the third node. Illustratively, then, the call path is made up of only two trunks, a different one leading from the service provider's node to each of the first and second nodes.

In a preferred embodiment, the request and response are communicated between the service provider's node and the third node over a path or channel that is restricted to control communications—a data-only connection—such as an ISDN D channel. No customer-communication paths, e.g., voice trunks, are unnecessarily occupied thereby.

Advantageously, the private ownership and control aspects of the customer's private network are maintained, notwithstanding the reduction in the number of trunks used in a call path. Specifically, the customer maintains ownership and control not only of the routing data for the private network, but also of the third, the "tandem", node which either stores or generates that routing data and provides it to the service provider. Consequently, the customer need not relinquish any control over, or possession of, any part of the private network —other than, possibly, the trunks—to the service provider in order to obtain the benefits of this invention.

To obtain routing information from the "tandem" node, the service supplier's node must, of course, have a communication connection thereto. However, that connection need not be a call-type connection, such as a telephony trunk, but may be a much more specialized connection for the communication of control information only, such as an ISDN D channel.

These and other advantages and features of the invention will become more apparent from the following description of an illustrative embodiment of the invention considered together with the drawing.

BRIEF DESCRIPTION OF THE DRAWING

FIG. 6-7 show a flow diagram of a messaging function of the tandem node of FIG. 1.

DETAILED DESCRIPTION

Figure 1:
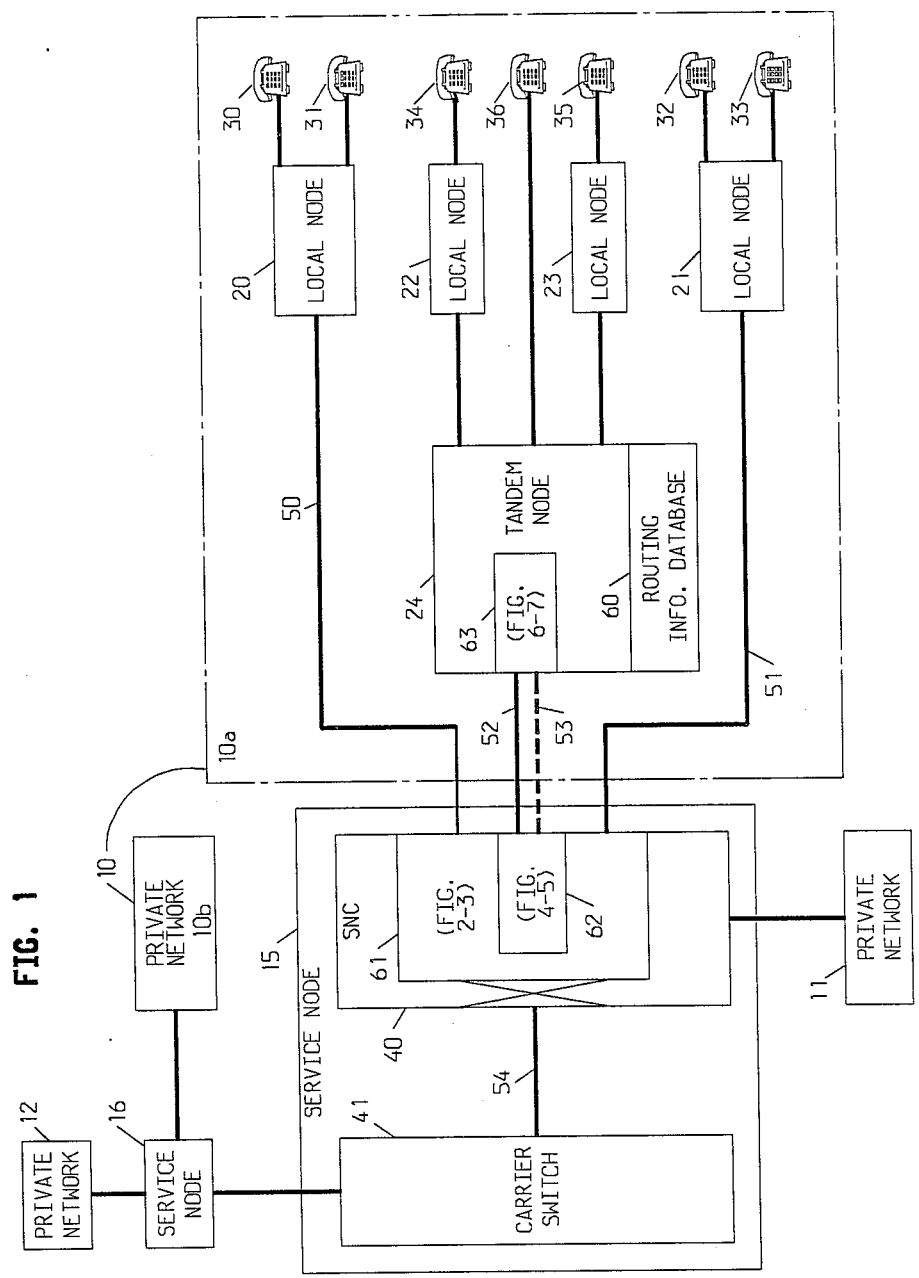
FIG. 1 shows a block diagram of a private communication network architecture embodying an illustrative example of the invention.
Figure 2:
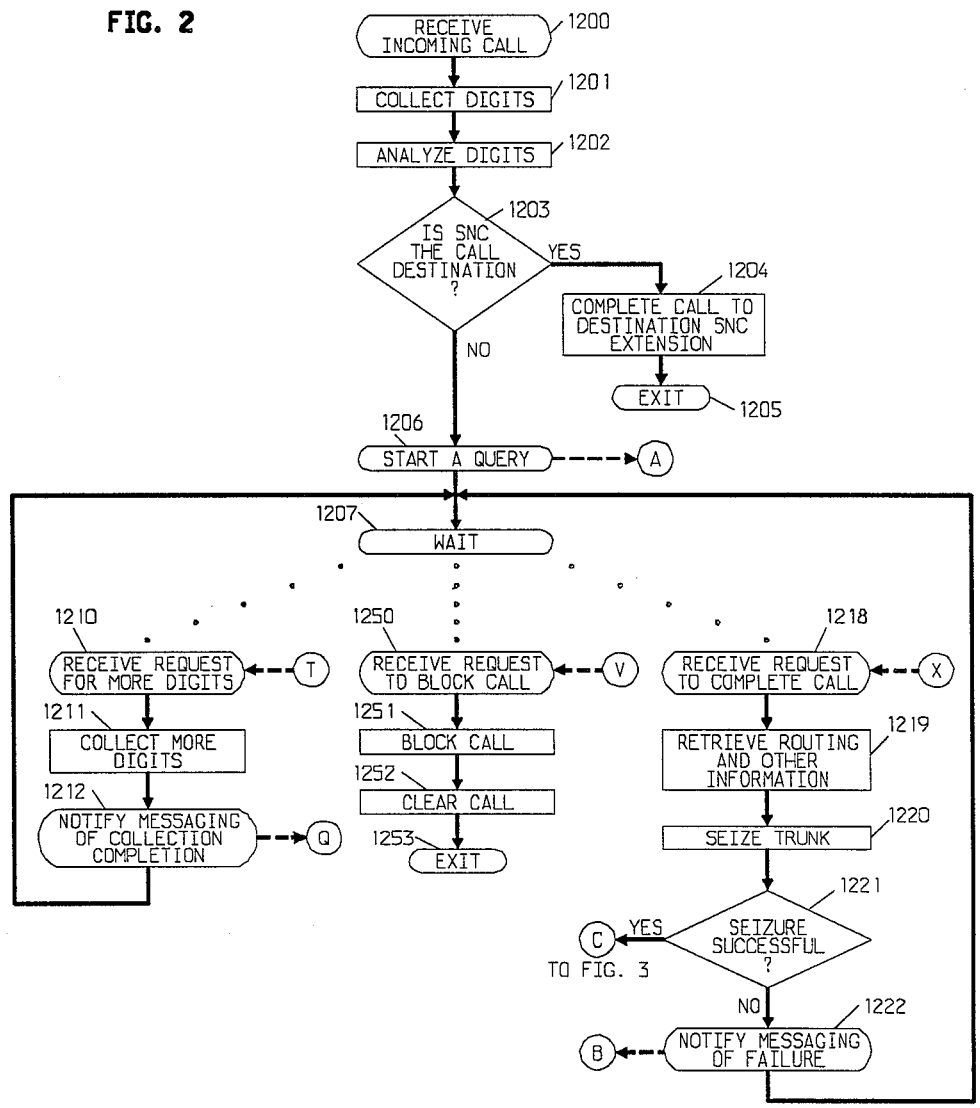
FIGS. 2-3 show a flow diagram of a call processing function of the SNC of FIG. 1.
Figure 3:
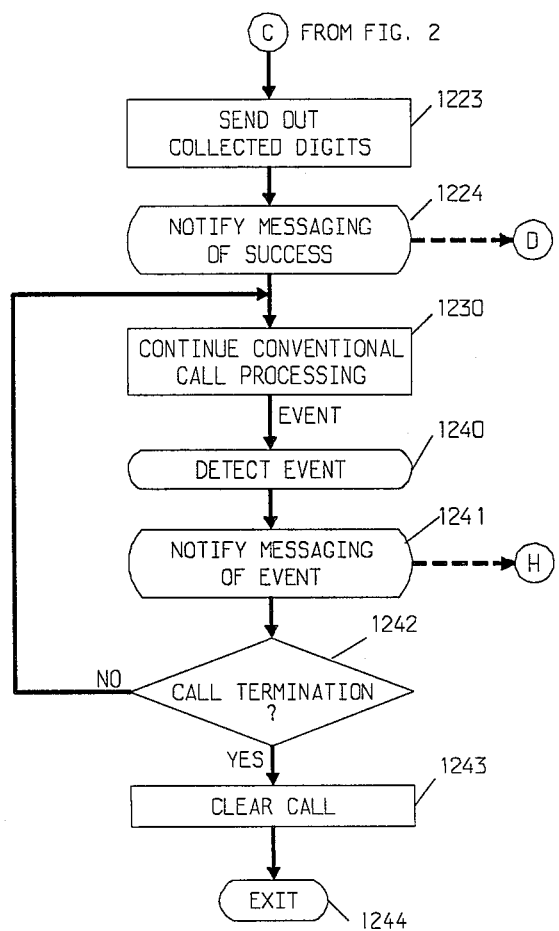
Figure 4:
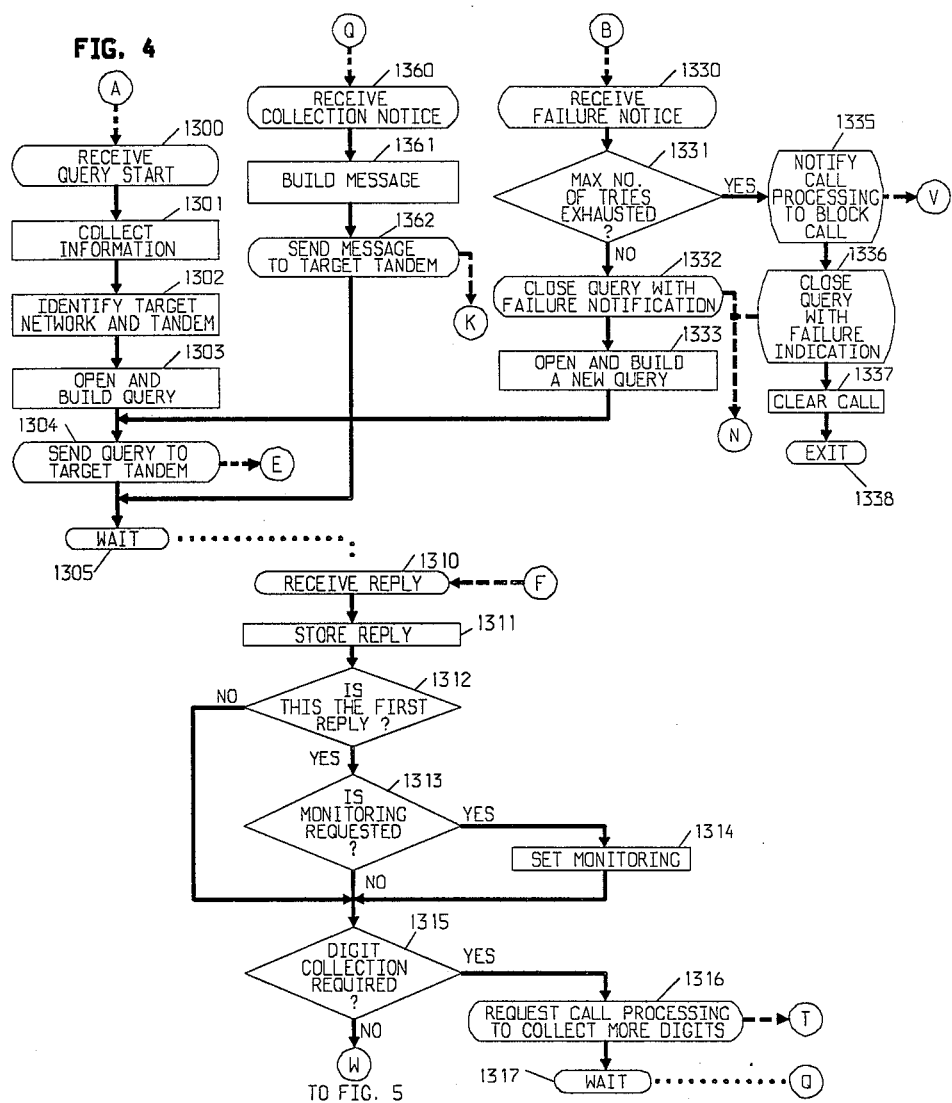
FIGS. 4-5 show a flow diagram of a messaging function of the SNC of FIG. 1.
Figure 5:
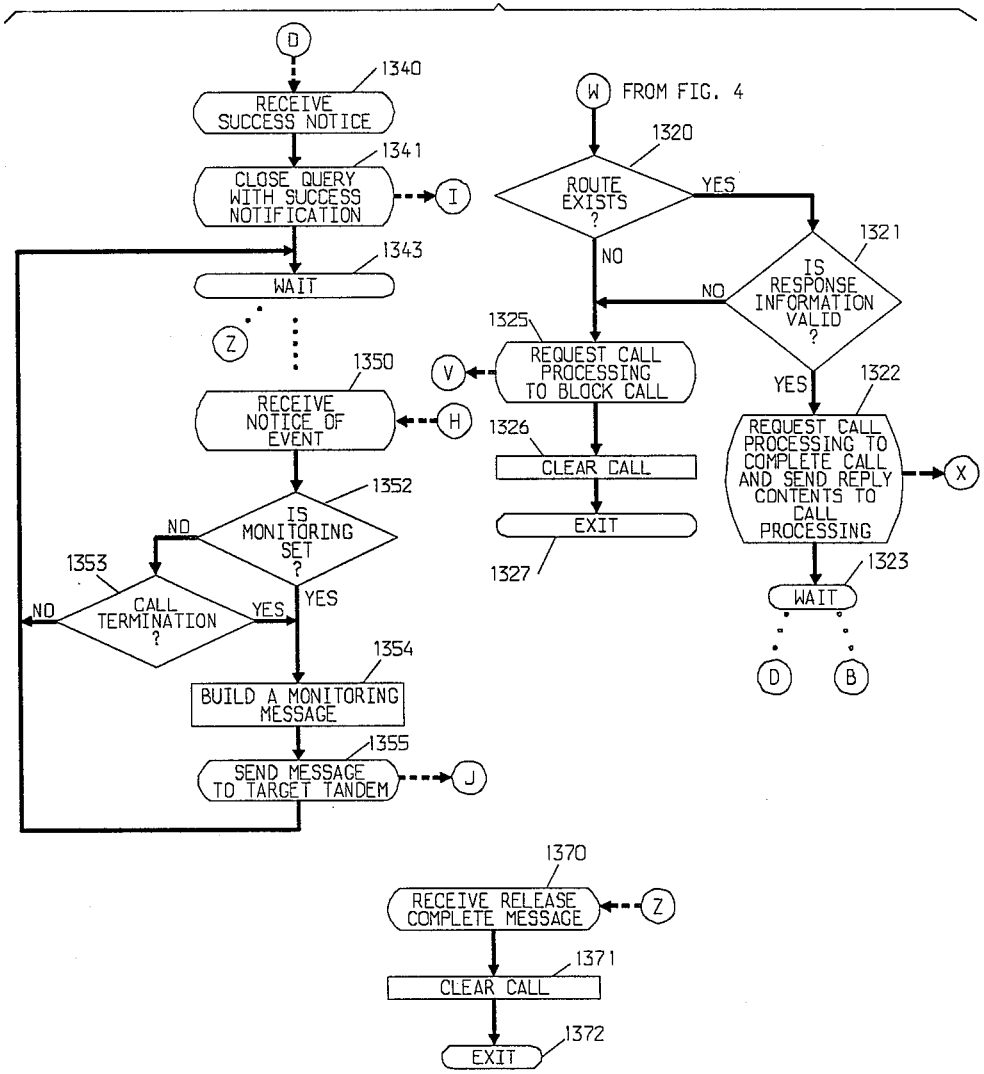
Figure 6:
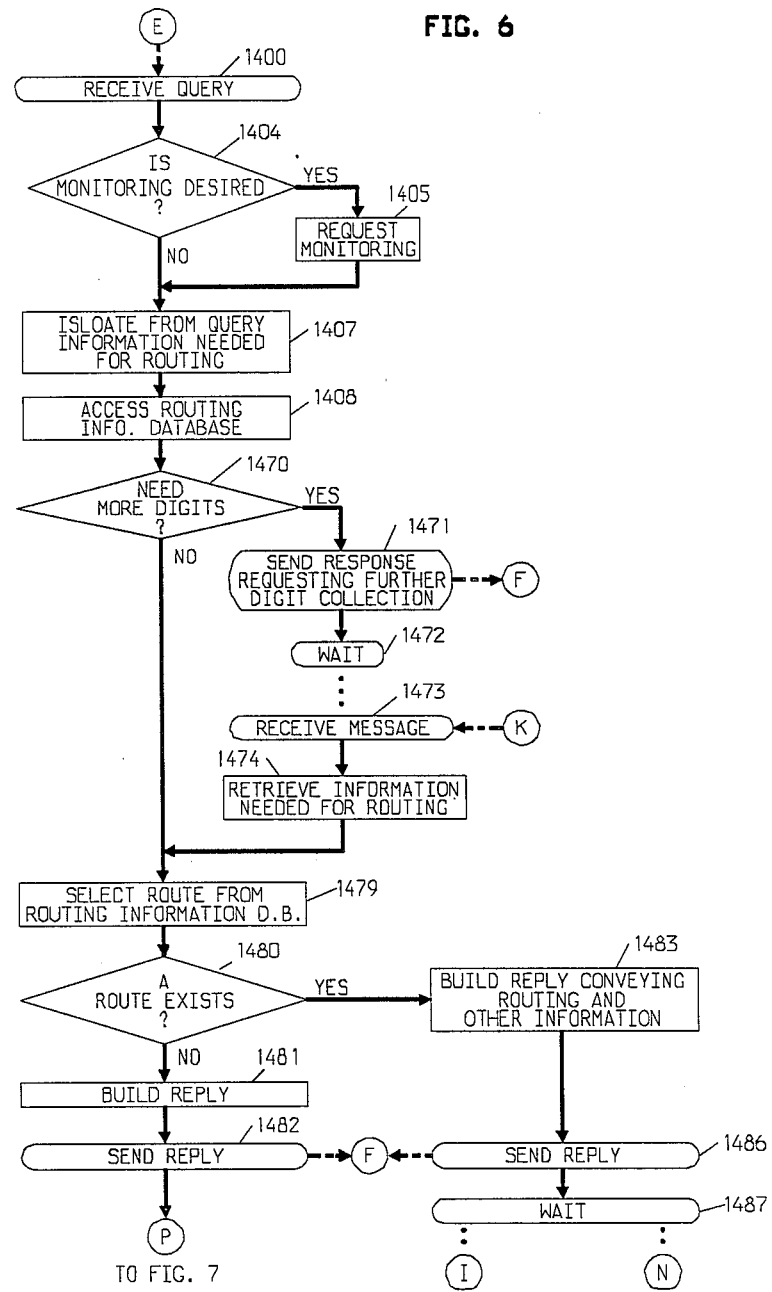

FIG. 1 shows an illustrative example of a private communication network architecture. A plurality of separate private networks 10-12 are shown. They are connected to each other and to the public network (not shown) via service nodes 15-16 of a provider of interconnection services, such as an interexchange carrier. Typically, each private network 10-12 belongs to a different customer of the service provider, such as a different corporation or government agency. Private network 10 is shown as made up of two geographically dispersed portions 10a and 10b. The two portions of network 10 are connected to different nodes 15 and 16 of the service provider; they are connected to each other through the service provider's network which includes the nodes 15 and 16.

Only one portion (10a) of private network 10 is shown in more detail, as being representative of all private networks 10-12 or portions thereof. Portion 10a of network 10 is made up of a plurality of local nodes 20-23 and a tandem node 24. Each node 20-24 illustratively comprises a private branch exchange (PBX), such as the AT&T System 75 or System 85. Customer terminals 30-35—illustratively telephones, terminals, and computers—are connected directly to local nodes 20-23. One or more other terminals, represented by terminal 36, are illustrtively connected directly to tandem node 24, through tandem node 24 serves principally to interconnect local nodes 20-23. Nodes 20-24 provide switching and other services for equipment and other nodes which are connected thereto, in a conventional manner.

Unlike local nodes 22-23, some loccal nodes 20-21 are not connected to each other directly through tandem node 24, but rather indirectly through a service network controller (SNC) 40 of service node 15. SNC 40 is llustratively also a PBX such as the AT&T System 85, and it provides switching and other services to nodes which are connected thereto. SNC 40 can interconnect nodes 20-21 directly, can connect nodes 20-21 to nodes 22-23 through tandem node 24 which is also connected to SNC 40, and can connect nodes 20-24 of portion 10a of network 10 to nodes of portion 10b of network 10 or to the public network (not shown). The latter connection is established through a carrier switch 41—illustratively an AT&T 1AESS switch—which also forms a part of service node 15.

SNC 40 is also connected to private network 11 in substantially the same manner as it is connected to network 10. SNC 40 interconnects nodes of network 10 with nodes of network 11 through carrier switch 41. SNC 40 does not interconnect nodes of networks 10 and 11 directly, because each private network 10 and 11 has its own dialing plan and the two may overlap. Hence, a public network dialing plan, administered by switch 41, must be involved in order to avoid any private network dialing plan conflicts. Consequently, connections between networks 10 and 11 are made by SNC 40 through switch 41.

Connection between SNC 40 and nodes 20-21 and 24 is via trunks 50-52. Each node is connected to SNC 40 by one or more of these trunks, which may be grouped into one or more trunk groups, in a conventional manner. The signaling type of the trunks is irrelevant—for example, the trunks may be analog telephony trunks, or digital trunks such as ISDN trunks. Connection between SNC 40 and switch 41 is via trunks 54.

In accordance with the invention, either included among trunks 52 that connect tandem node 24 to SNC 40, or providing separate connections between node 24 aand SNC 40, are one or more control links 53. As will be made clear below, a link 53 is used to communicate call-routing information from tandem node 24 to SNC 40. Illustratively, a link 53 is a conventional data link, or the D channel of a trunk 52, respectively, that uses an ISDN "xB+D" protocol.

Tandem node 24 includes a database 60 of conventional call-routing information pertaining to private network 10. This information is not possessed by SNC 40. However, SNC 40 provides switched, as opposed to static, interconnection between trunks 5-52, and also between trunks 50-52 and trunks 54 leading to carrier switch 41, and for this purpose it must have access to the routing information. Hence, whenever SNC 40 receives an incoming call requiring establishment of a call connection—a call path—either between local nodes 20 and 21, or between a node 20 or 21 and tandem 24, or between a node 20-24 and a node of the other portion of private network 10, it must call upon tandem node 24 to provide the requisite routing information. SNC 40 obtains this information through links 53.

The architecture and functionality of SNC 40 are diagrammed in FIGS. 2-11 of the above-identified application of Bales and Miller and are described in the text that accompanies those figures. The above-identified application is hereby incorporated herein by reference.

In this application, FIGS. 2-3, 4-5, and 6-7 respectively flowchart the operations performed by the circuit call processing portion (denoted 305 in FIG. 3 of the Bales-Miller application) of SNC 40 in processing a customer call, and the operations performed by applications portion of SNC 40 (denoted 308 in FIG. 3 of the Bales-Miller application) and by tandem 24 in processing a message communication between them. These figures are referred to jointly in the discussion that follows of how an illustrative call is established and processed. While the illustrative example of the Bales-Miller application deals with circuit-based communications, the principles thereof applicable to non-circuit-based, i.e., message- or packet-based, communications, as well.

SNC 40 receives a call in a standard manner, at step 1200. The call may be received over a trunk 50-52 or 55 from the local portion 10a of private network 10, over a trunk from another locally-connected private network such as network 11, or via switch 41 from a remotely-connected private network 12, remote portion 10b of private network 10 portion, or the public network. For illustrative purposes, assume that the call is coming in from local node 20 over trunk 50.

In response to receipt of the call at step 1200, SNC 40 call processing 61 receives and collects digits that are associated with the received call, again in a standard manner, at step 1201. These steps include destination address digits—the called number—and optionally include other digits, such as traveling class marks, that are used for call-routing purposes.

Having received the digits at step 1201, SNC 40 call processing 61 analyzes them in a conventional manner, at step 1202, to determine, at step 1203, whether SNC 40 itself is the destination of the call. SNC 40 may be the destination of special-purpose calls, such as maintenance calls. If SNC 40 call processing 61 determines at step 1203 that it is the call destination, it completes the call by connecting it to an SNC 40 extension that is designated by the collected digits, at step 1204. SNC 40 call processing 61 then exits, at step 1205.

IF SNC 40 call processing 61 determines at step 1203 that SNC 40 is not the call destination, SNC 40 call processing 61 requires routing information to properly route the call SNC 40 call processing 61 therefore starts—initiates—a query for the requisite routing information, by signaling SNC 40 messaging 62 to cause it to obtain the requisite routing information from the private network, at step 1206. SNC 40 call processing 61 then waits for the information, at step 1207.

In response to receiving the query start signal at step 1300, SNC 40 messaging 62 collects information needed to formulate a query, particularly information regarding which trunk the call came in on, and retrieves the digits and other available information that was collected by SNC 40 call processing 61 at step 1201, at step 1301. Any trunk group connected to SNC 40 is "owned" by, or associated with and controlled by, only one private network. Additionally, in a private network having more than one tandem node, different trunk groups of the network are "owned" by different tandem nodes. From the trunk group of the incoming trunk 52 or 54, then, SNC 40 messaging 62 identifies the one, target, network of the private networks 10 and 11 that are connected to SNC 40, and the one, target, tandem node of their tandem nodes that "owns" the incoming trunk 52 and 54 and to which the query should be addressed, at step 1302.

SNC 40 messaging 62 then builds a query from the collected information, at step 1303, sends it to the target tandem node, at step 1304, and then waits for an answer, at step 1305. Assuming that the target network and tandem node are private network 10 and tandem node 24, respectively, SNC 40 messaging 62 sends the query over link 53. The query is a message in the format followed by link 53—an ISDN layer 3 message in this example where link 53 is an ISDN D channel. The message carries the collected information to target tandem node 24 and requests call-routing information based on that information in response. SNC 40 messaging 62 associates the query with the particular call by assigning to and including in the query a call reference value (CRV). This CRV is used henceforth in communications between SNC 40 and tandem node 24 to associate those communications with that particular call.

Messaging function 63 of the target tandem node—tandem node 24 in this example—receives the query over link 53, at step 1400. In response, function 63 checks whether call monitoring is desired, at step 1404. Call monitoring is an option available to the customer, for tracking—such as for administrative or maintenance purposes—selected events that occur during a call. Function 63 makes the determination of whether monitoring is desired illustratively by checking the status of an internal flag. If monitoring is desired, function 63 sets up to include in the first reply to the received query a request for monitoring, at step 1405. If call monitoring is not desired, or following step 1405, function 63 isolates from the received query whatever information it needs to do the call routing, at step 1407. Illustratively, this information comprises at least the called-number digits that were collected by SNC 40. Function 63 then enters database 60 of conventional routing information located in tandem node 24, at step 1408, to select therefrom a route for the call on the basis of the isolated information.

From the database, function 63 may determine that it needs additional digits—an authorization code, for example—before it can select a route for the call, as determined at step 1470. If that is the case, function 63 formulates and sends a reply message to SNC 40 messaging 62 in reply to the query, wherein it requests that additional digits be collected, at step 1471. Function 63 then awaits a response to its request, at step 1472.

Upon receipt of the reply message from tandem node 24, at step 1310, SNC 40 messaging 62 stores the reply, at step 1311. SNC 40 messaging 62 then checks whether this is the first reply message in this query that it has received from tandem node 24, at step 1312. If this is the first query reply message, then it contains information on whether or not monitoring is requested. SNC 40 messaging 62 therefore checks this information, at step 1313, and if monitoring is requested, SNC 40 messaging 62 sets monitoring, illustratively by setting an internal flag (not shown) to indicate that monitoring was requested, at step 1314.

If the received reply is not the first reply, as determined at step 1312, if monitoring has not been requested, as determined at step 1313, or after setting monitoring, at step 1314, SNC 40 messaging 62 checks the received reply to determine whether collection of additional digits is required, at step 1315. If additional digit collection is required, SNC 40 messaging 62 requests SNC 40 call processing 61 to do so, at step 1316, and then waits for the digit collection to be completed, at step 1317.

Upon receipt of the request from SNC 40 messaging 62 for further digit collection, at step 1210, SNC 40 call processing 61 collects more digits, in a conventional manner, at step 1211, illustratively initiating the collection by prompting a caller to input more digits. Once the digits are collected, SNC 40 call processing 61 notifies SNC 40 mesaging 62 of that fact, at step 1212. SNC 40 call processing 61 then returns to step 1207 to await a response to its original query.

Upon receiving the notice that additional digits were collected, at step 1360, SNC 40 messaging 62 builds a message containing the newly-collected digits, at step 1361, and sends the message to tandem node 24, at step 1362. SNC 40 mesaing 62 then returns to step 1305 to await a reply to the query.

When it receives the message conveying the additionally-collected digits, at step 1473, or if it had determined at step 1470 that collection of additional digits is not needed, messaging function 63 of tandem node 24 retrieves the information that it isolated from the original query, at step 1474, and uses it with the just received digits to select from database 60 a route for the call, at step 1479. Tandem node 24 keeps track in database 60 of the status of the trunk groups that it owns (e.g., via call monitoring), and this information is used at step 1479 in the route selection process.

At step 1479, function 63 may find that it cannot select a route, because no suitable route exists, as determined at step 1480. If not route exits, function 63 builds a query reply conveying this fact, at step 1481, and sends it to SNC 40 messaging 62, at step 1482. Since no route exists, the call cannot be completed, so function 63 then clears whatever information it may have that pertains to this call, at step 1490, and exits, at step 1491.

SNC 40 messaging 62 receives the reply message, at step 1310, and proceeds through steps 1311 to 1315 as described above. At step 1315, SNC 40 messaging 62 determines that digit collection is not called for by the reply and proceeds to determine from the reply whether a route for the call exists, at step 1320. Upon determining from the reply message that no route exists, SNC 40 messaging 62 requests SNC 40 call processing 61 to block the call, at step 1325. SNC 40 messaging 62 then clears whatever information it may have that pertains to this call, at step 1326, and exits, at step 1327.

In response to receiving the request to block the call, at step 1250, SNC 40 call processing 61 does so, in a conventional manner, at step 1251. SNC 40 call processing 61 then clears any information it may have that pertains to this call, at step 1252, and exits, at step 1253.

Returning to step 1480 of tandem node 24 of function 63, if a route for the call exists and has been selected, function 63 builds a reply to the received query conveying information that specifies the selected route, at step 1483. The reply, like the query, is a message in the format of link 53, and it contains the routing information on the selected route, illustratively the I.D. of a particular trunk group. The reply also conveys to SNC 40 the digits and any other information that should be sent out on that route. Function 63 then sends the reply to SNC 40, at step 1486, and waits for further input from SNC 40, at step 1487.

Upon receipt of the query response, at step 1310, SNC 40 messaging 62 proceeds through steps 1311–1320 in the manner described above. At step 1320, SNC 40 messaging 62 determines from the received reply that a route for the call exists, and proceeds to check the information to make sure that it is valid, at step 3121. The validity check determines whether the trunk group specified by the routing information exists, and if it does, whether it may be accessed by the target tandem node—tandem node 24 in this example. For a single-tandem node network portion such as the illustrative portion 10a, the latter check determines whether both the call's incoming and outgoing trunk groups are "owned"by the same one network 10. For a multi-tandem node network portion, additional checks are performed to determine whether the outgoing trunk group leads to another tandem node of the network portion or whether the incoming and outgoing tandem groups are "owned"by the same tandem node.

If the validity check at step 1321 fails, the call will not be completed, so SNC 40 messaging 62 proceeds to steps 1325–1327 to cause the call to be blocked and cleared, in the manner described previously. However, if the validity check at step 1321 succeeds, SNC 40 messaging 62 requests SNC 40 call processing 61 to complete the call, at step 1322, and forwards to SNC 40 call processing 61 the routing information and other message contents that were received from tandem node 24. SNC 40 messaging 62 then waits for further input from SNC 40 call processinq 61.

Upon receipt of the request from snc 40 messaging 62 to complete the call, at step 1218, SNC 40 call processing 61 retrieves the routing information and digits to be sent out that were forwarded to it by SNC 40 messaging 62 at step 1322, at step 1219. SNC 40 call processing 61 then uses the routing information to attempt to seize a trunk in the trunk group specified by that information—illustratively trunk 51—at step 1220. If the seizure is not successful –e.g., if there are no trunks available for seizure in the specified trunk group—as determined at step 1221, SNC 40 call processing 61 notifies SNC 40 messaging 62 of this fact, at step 1222. SNC 40 call processing 61 then returns to step 1207 to await further instructions from SNC 40 messaging 62.

In response to receiving the notice of failure of the trunk seizure attempt, at step 1330, SNC 40 messaging 62 checks how many attempts to seize a trunk for this call have been made, at step 1331. A seizure may be attempted only a limited number of times, illustratively four. If this number of attempts has not been exhausted, as determined at step 1331, SNC 40 messaging 62 closes the original query by sending a message to tandem node 24 to notify it of the failure of the selected route, at step 1332. But SNC 40 messaging 62 follows the failure notice with a request for a new roue by opening and building a new query, at step 1333, and sending the new query to target tandem node 24, at step 1304. SNC 40 messaging 62 then proceed stop step 1305 to await a response from tandem node 24 to this new query.

Upon receiving the query closure message with a failure indication, at step 1410, function 63 of tandem node 24 posts a notice to the craft to advise them of the problem, at step 1411. Illustratively, this involves displaying an error message on an administration terminal (not shown) of tandem node 24 along with information identifies the failure, such as the particular information that had been sent in the query response. Function 63 then clears whatever information it may have that pertains to this call, at step 1490, and exits, at step 1491.

Response of function 63 to the new query that follows the closure message is the same as its response to the original query, as shown in steps 1400 et seq. and described above.

Returning to step 331, if it is determined there that the maximum number of allowed seizure attempts for this call has been exhausted, SNC 40 messaging 62 requests SNC 40 call processing 61 to block the call, at step 1335.

SNC 40 call processing 61 receives the request at step 1250 and proceeds to steps 1251–1253 to respond to the request in the manner described above.

After requesting SNC 40 call processing 61 to block the call, at step 1335, SNC 40 messaging 62 closes the query by sending a message to tandem node 24 to notify it of the failure of the selected route, at step 1336. SNC 40 messaging 62 then clears whatever information, e.g., data structures, it may have that pertains to this call, at step 1337, and exits, at step 1338.

Function 63 receives the query closure message at step 1410 and responds thereto as described above.

Returning to step 1221, if the attempt by SNC 40 call processing 61 to seize an outgoing trunk for the call is successful, SNC 40 call processing 61 sends out on the seized trunk the digits and other information that was specified by tandem node 24 in the query reply, at step 1223. SNC 40 call processing 61 also notifies SNC 40 messaging 62 of the successful seizure, at step 1224. SNC 40 call processing 61 then continues with conventional call-processing activities, at step 1230.

Upon receiving the notice of success, at step 1340, SNC 40 messaging 62 closes the query by sending a message to tandem node 24 notifying it of the success, at step 1341. SNC 40 messaging 62 then waits for call-monitoring input from SNC 40 call processing 61, at step 1343.

Upon receiving the query closure message with a success indication, at step 1450, messaging function 63 of tandem node 24 proceeds to wait for call-monitoring input from SNC 40, at step 1343. (Alternatively, function 63 could at this point proceed to steps 1490-1491.)

Returning to step 1230, as part of conventional processing of the call, SNC 40 call processing 61 monitors the occurrene of certain events, such as alerting, answer supervision, and call termination. When it detects one of these events, at step 1240, SNC 40 call processing 61 notifies SNC 40 messaging 62 of the event, at step 1241. If the event is call termination, as determined at step 1242, the task of SNC 40 call processing 61 with respect to this call is completed, so SNC 40 call processing 61 clears whatever information it may have pertaining to this call, at step 1243, and then exits, a step 1244. If the event is not call termination, SNC 40 call processing 61 returns to step 1230 to continue conventional call processing, including monitoring for the occurrence of further events.

In response to receiving notice of an event from SNC 40 call processing 61, at step 1350, SNC 40 messaging 62 checks whether monitoring has been requested for this call, at step 1452. If not, SNC 40 messaging 62 checks whether the event is call termination, at step 1353. If monitoring was not requested and the event is not call termination, SNC 40 messaging 62 ignores the event and returns to step 1343 to wait for further input regarding this call from SNC 40 processing 61.

If, however, either monitoring was requested or the reported event is call termination, SNC 40 messaging 62 builds a message identifying the event, at step 1354, and sends the message to tandem node 24, at step 1355. SNC 40 messaging 62 then returns to step 1343 to wait for further input pertaining to the call.

Upon receiving the message notifying it of occurrence of an event, at step 1459, messaging function 63 of tandem node 24 checks whether monitoring has been requested for the call, at step 1460. If monitoring was requested, function 63 updates status information for that particular event, at step 1461, illustratively by recording call-detail information associated with the event. Following step 1461, or if monitoring was not requested, function 63 checks whether the reported event is call termination, at step 1462. If the event is not call termination, function 63 returns to step 1452 to await notice of further events. If the reported event is call termination, function 63 closes the query that had been established for this call, by sending a release complete message to SNC 40. Function 63 then advances to step 1490 to clear information it has about this call, and then exits, at step 1491.

SNC messaging 62 receives the release complete message, at step 1370, while waiting for further input regarding the call at step 1343. Upon receiving this notification that all activities required on behalf of the call are completed, SNC 40 messaging 62 clears whatever information it has regarding the call, at step 1371, and then exits, at step 1372.

In the illustrative embodiment described above, if trunks 52 are ISDN trunks, then tandem-originated and tandem-terminated calls may be handled somewhat differently from other calls, in order to achieve even further efficiencies. For calls originating with tandem node 24, tandem node 24 looks up the call-routing information in database 60 prior to the call being connected to SNC 40, and then connects the call to SNC 40 over trunk 52 and at the same time sends the routing information to SNC 40 over trunk 52. No query from SNC 40 or a separate link 53 is required. Call monitoring is then done by tandem node 24 directly, by using conventional call-control messages passing over trunk 52. For calls terminating with tandem 24, the call-path establishment procedure is as described in conjunction with FIGS. 2-7. However, once the call is connected to tandem node 24 over trunk 52, the separate control connection for that call on link 53 is cleared by tandem node 24, and call monitoring is done by tandem node 24 directly, by using conventional call-control messages passing over trunk 52.

Of course, it should be understood that various changes and modifications to the illustrative embodiment described above will be apparent to those skilled in the art. For example, the node that includes the database of private network routing information need not be a tandem switching node, but may be a database-only node having no switching capability. Also, the disclosed implementation is easily extended to encompass a private network portion comprising more than one tandem node: the SNC handles inter-tandem node calls by establishing, in cooperation with the originating tandem node, a call connection from the originating runk to a trunk leading the destination tandem node, in the manner described above, and then treating the call as if it had originated on the trunk leading to the destination tandem node and repeating the above-described activities in conjunction with the destination tandem node, in order to establish a final call connection from the originating trunk to a final destination trunk. Such changes and modifications can be made without departing from the spirit and the scope of the invention and without diminishing its attendant advantages. It is therefore intended that all such changes and modifications be covered by the following claims.

We claim:

1. Apparatus for providing a call-connection service to a customer of the service in a network of communication nodes, the apparatus comprising:

means in a first one of the nodes for responding to a request from the customer for establishment of a call path between second and third ones of the nodes, by obtaining from a fourth one of the nodes call-routing information pertaining to the second and third ones of the nodes, the first one of the nodes being under control of the service provider, and the second, third, and fourth ones of the nodes being under control of the customer; and means in the first one of the nodes for interconnecting, in response to the obtained call-routing information, a) a call path extending between the first one of the nodes and the second one of the nodes and b) a call path extending between the first one of the nodes and the third one of the nodes to form a call path between the second and third ones of the nodes which bypasses the fourth one of the nodes.

2. Apparatus for providing a call-connection service to a customer of the service in a network of communication nodes, the apparatus comprising the steps of:

means for receiving at a node of the network that is under control of a provider of the service a request from the customer for establishment of a call path between a first and a second node of the network that are under control of the customer;

means connected to the request-receiving means for sending a request for call-routing information from the node of the service provider to a third node of the nework that is under control of the customer, in response to the received request;

means for receiving call-routing information from the third node at the node of the service provider; and means connected to the call-routing information-receiving means for connecting, at the node of the service provider, a call path extending between the node of the service provider and the first node with a call path extending between the node of the service provider and the second node to form a call path between the first and the second nodes that bypasses the third node, in response to the received call-routing information.

3. The apparatus of claim 2 wherein the means for sending a request for call-routing information comprises means for sending a data message over a control communication link connecting the node of the service provider with the third node of the customer; and wherein the means for receiving call-routing information comprises means for receiving a data message over the control communication link.

4. The apparatus of claim 2 wherein the means for sending a request for call-routing information comprises means for sending a message over a D channel of an ISDN link connecting the node of the service provider with the third node of the customer; and wherein the means for receiving call-routing information comprises means for receiving a message over the D channel of the ISDN link.

5. The apparatus of claim 2 wherein the means for receiving a request for establishment of a call path comprises means included in a call-path switching apparatus operated by the provider of the service for receiving a request from the customer for establishment of a call-path between a first and a second call-path switching apparatus operated by the customer; and wherein the means for sending a request for call-routing information comprises means includes in the call-path switching apparatus operated by the provider of the service for sending a request for the customer's call-routing information to a routing-information-generating apparatus operated by the customer.

6. A method of providing a call-connection service to a customer of the service in a network of communication nodes, the method comprising the steps of:

responding at a first one of the nodes to a request from the customer for establishment of a call path between second and third ones of the nodes, by obtaining from a fourth one of the nodes call-routing information pertaining to the second and third ones of the nodes, the first one of the nodes being under control of the service provider, and the second, third, and fourth ones of the nodes being under control of the customer; and interconnecting at the first one of the nodes, in response to the obtained call-routing information, (a) a call path extending between the first one of the nodes and the second one of the nodes and (b) a call path extending between the first one of the nodes and the third one of the nodes to form a call path between the second and third ones of the nodes which bypasses the fourth one of the nodes.

7. Method of providing a call-connection service to a customer of the service in a network of communication nodes, comprising the steps of:

receiving at a node of the network that is under control of a provider of the service a request from the customer for establishment of a call path between a first and a second node of the network that are under control of the customer;

sending a request for call-routing information from the node of the service provider to a third node of the network that is under control of the customer, in response to the received request;

receiving call-routing information from the third node at the node of the service provider;

connecting, at the node of the service provider, a call path extending between the node of the service provider and the first node with a call path extending between the node of the service provider and the second node to form a call path between the first and the second nodes that bypasses the third node, in response to the received call-routing information.

8. The method of claim 7 wherein the step of sending a request for call-routing information comprises the step of sending a data message over a control communication link connecting the node of the service provider with the third node of the customer; and wherein the step of receiving call-routing information comprises the step of receiving a data message over the control communication link.

9. The method of claim 7 wherein the step of sending a request for call-routing information comprises the step of sending a message over a D channel of an ISDN link connecting the node of the service provider with the third node of the customer; and wherein the step of receiving call-routing information comprises the step of receiving a message over the D channel of the ISDN link.

10. The method of claim 7 wherein the step of receiving a request for establishment of a call path comprises the step of receiving at a call-path switching apparatus operated by the provider of the service a request from the customer for establishment of a call path between a first and a second call-path switching apparatus operated by the customer; and wherein the step of sending a request for call-routing information comprises the step of sending a request for the customer's call-routing information from the call-path switching apparatus operated by the provider of the service to a routing-information-generating apparatus operated by the customer.

* * * * *